United States Patent
Halmos

(10) Patent No.: US 9,354,317 B2
(45) Date of Patent: May 31, 2016

(54) SIMULTANEOUS FORWARD AND INVERSE SYNTHETIC APERTURE IMAGING LADAR

(71) Applicant: Raytheon Company, Waltham, MA (US)

(72) Inventor: Maurice J. Halmos, Encino, CA (US)

(73) Assignee: Raytheon Company, Waltham, MA (US)

( * ) Notice: Subject to any disclaimer, the term of this patent is extended or adjusted under 35 U.S.C. 154(b) by 84 days.

(21) Appl. No.: 14/274,026

(22) Filed: May 9, 2014

(65) Prior Publication Data

US 2015/0293229 A1   Oct. 15, 2015

Related U.S. Application Data

(60) Provisional application No. 61/977,254, filed on Apr. 9, 2014.

(51) Int. Cl.
　　*G01B 11/26* (2006.01)
　　*G01S 17/89* (2006.01)
　　*G01S 17/50* (2006.01)

(52) U.S. Cl.
　　CPC .............. *G01S 17/895* (2013.01); *G01S 17/50* (2013.01)

(58) Field of Classification Search
　　CPC ... G01S 17/895; G01S 13/9023; G01S 7/414; G01K 11/006; H01Q 21/06
　　See application file for complete search history.

(56) References Cited

U.S. PATENT DOCUMENTS

| | | | | |
|---|---|---|---|---|
| 4,563,686 A * | 1/1986 | Boles | .................. | G01S 13/9023 342/179 |
| 4,794,395 A * | 12/1988 | Cindrich | .............. | G01K 11/006 342/25 C |
| 2005/0057654 A1 * | 3/2005 | Byren | ................... | G01S 17/895 348/169 |
| 2007/0018089 A1 * | 1/2007 | Kim | ....................... | H01Q 21/06 250/250 |
| 2012/0206293 A1 * | 8/2012 | Nguyen | .................. | G01S 7/414 342/25 F |

OTHER PUBLICATIONS

Ward K. D. et al., "Hybrid SAR-ISAR Imaging of Ships," IEEE Radar Conference, May 7, 1990, pp. 64-69.

(Continued)

*Primary Examiner* — Luke Ratcliffe
*Assistant Examiner* — Samantha K Abraham
(74) *Attorney, Agent, or Firm* — Burns & Levinson LLP; Joseph M. Maraia

(57) ABSTRACT

Devices and techniques for combined forward and inverse synthetic aperture imaging LADAR (combined SAL) include scanning a non-stationary target with an optical signal emitted from a non-stationary laser source, receiving reflections of the signal on a receiver, and determining the combined synthetic aperture.

16 Claims, 9 Drawing Sheets

(56) References Cited

OTHER PUBLICATIONS

Porter N. J. et al. "SAR, ISAR and hybrid SAR/ISAR—a unified Treatment of Radar Imaging", Radar Conference, 1993, Record of the 1993 IEEE National Lynnfield, MA, USA Apr. 20-22, 1993, New York, NY US, Apr. 20, 1993, pp. 134-139.

Brenner A. R. et al., "Demonstration of Advanced Reconnaissance Techniques with the Airborne SAR/GMTI Sensor PAMIR", IEE Proceedings: Radar, Sonar & Navigation, Institution of Electrical Engineers, GB, vol. 153, No. 2, Apr. 13, 2006, pp. 152-162.

Huadong Sun et al., "They Hybrid SAR-ISAR Imaging Algorithm applied to SAR Moving Target Imaging", Fuzzy Systems and Knowledge Discovery (FSKD), 2012 9th International Conference ON, IEEE May 29, 2012, pp. 1985-1988.

Kachelmyer, Alan L., "Inverse Synthetic Aperture Radar (ISAR) image Processing", Proceedings of SPIE, Jun. 1, 1992, pp. 193-205.

Hong, Chen et al., "Inverse Synthetic Aperture Ladar Imaging with the Range Instantaneous Doppler Algorithm" Signal Processing (ICSP), 2010 IEEE 10th International Conference ON, IEEE, Piscataway, NJ, USA, Oct. 24, 2010, pp. 2027-2030.

Xiao-You Yang et al., "Imaging Algorithm for Inverse Synthetic Aperture LIDAR", Laser & Infared, vol. 40, No. 8, Aug. 1, 2010 pp. 904-909.

Xu Liu et al., "Developing Technologies and Key Problems of Inverse Synthetic Aperture lidar", Laser and Laser Engineering, vol. 38, No. 4, Aug. 1, 2009, pp. 642-649.

* cited by examiner

SIMULTANEOUS FORWARD AND INVERSE SYNTHETIC APERTURE IMAGING LADAR

CROSS REFERENCE TO RELATED APPLICATIONS

This application is based on and claims priority to U.S. Provisional Patent Application No. 61/977,254 filed on Apr. 9, 2014, the entire contents of which are incorporated herein by reference.

TECHNICAL FIELD

The present disclosure relates generally to the field of laser imaging. More particularly, this application relates to the technology of optical synthetic aperture imaging.

BACKGROUND

Long range target identification, e.g., using laser detection and ranging (LADAR), plays an important role in defenses and space awareness.

Synthetic aperture imaging is an important technique that allows obtaining a high-resolution image of a target beyond what the real optical aperture could provide. For LADAR, synthetic aperture imaging is typically divided into two regimes. Forward (or traditional) Synthetic Aperture Imaging LADAR (SAL) assumes that a target is static and the LADAR is moving, where the movement provides a (synthetic) aperture capture. Inverse SAL (ISAL) assumes that the LADAR is static and that the target is rotating relative to the LADAR, thereby creating multiple look angles that are the equivalent of a large (synthetic) aperture capture.

In each case, motions of the static component are usually outside of the imaging process and yield an error in the reconstruction. However, such error is often unacceptable where high accuracy is desirable, such as during air-to-air surveillance and/or during combat, where both the target and the LADAR are moving and there is also additional target rotation.

SUMMARY

A need therefore exists for methods and systems for simultaneous forward and inverse synthetic aperture imaging.

In one aspect, a method for combined forward and inverse synthetic aperture LADAR imaging is provided. The method includes scanning a non-stationary target by emitting an optical signal from a non-stationary laser source. The method also includes receiving, by a receiver having a real aperture, one or more reflections of the optical signal from the non-stationary target, wherein the one or more reflections are received over an observational duration. The method also includes determining, by a processor, an angular resolution $\theta_{res}$ of a synthetic aperture of the receiver in an azimuth direction according to a wavelength $\lambda$ of the optical signal, a velocity vector $\vec{V}$ of the non-stationary laser source, an angle $\theta$ measured between an axis perpendicular to $\vec{V}$ and the non-stationary target, an angular velocity vector $\vec{\Omega}$ of the non-stationary target, a distance R between the non-stationary laser source and the non-stationary target, and the observational duration $T_{SA}$. The angular resolution of the synthetic aperture of the receiver in the azimuth direction is narrower than an angular resolution of the real aperture of the receiver in the azimuth direction.

Any of the aspects and/or embodiments described herein can include one or more of the following embodiments. In some embodiments, the angular resolution $\theta_{res}$ of the synthetic aperture of the receiver in the azimuth direction varies directly with the wavelength $\lambda$ and inversely with the observational duration $T_{SA}$. In some embodiments, the angular resolution $\theta_{res}$ of the synthetic aperture of the receiver in the azimuth direction is according to the relationship $$\theta_{res} = \frac{\lambda}{2(\vec{V}\cos\theta + \vec{\Omega}\cdot R)\cdot T_{SA}}.$$

In some embodiments, the method includes dividing the angular resolution of the real aperture of the receiver into a plurality of range bins in the down-range direction, each of the range bins sized according to a range resolution of the optical signal. In some embodiments, the method includes assigning each of the one or more reflections received by the receiver to at least one of the plurality of range bins. In some embodiments, the method includes dividing the angular resolution of the real aperture of the receiver into at least one synthetic aperture resolution element, the at least one synthetic aperture resolution element having a width in the azimuth direction corresponding to the angular resolution of the synthetic aperture of the receiver and a length in the down-range direction corresponding to a size of one of the plurality of range bins. In some embodiments, the method includes plotting, for the at least one synthetic aperture resolution element, a range-Doppler map of any of the one or more reflections located within the at least one synthetic aperture element. In some embodiments, the method includes applying motion compensation to the one or more reflections assigned to each of the range bins, wherein the motion compensation includes one or more of global motion compensation, motion estimation, block motion compensation, variable block-size motion compensation, overlapped block motion compensation, quarter pixel motion compensation, half pixel motion compensation, a block-matching algorithm, a phase correlation, a pixel recursive algorithm, optical flow methods, corner detection, and/or random sample consensus. In some embodiments, a waveform of the optical signal is a pulse waveform, a chirp waveform, and/or a more complex waveform with a large time-bandwidth product. In some embodiments, the method further includes correcting errors in data processed by the processor. In some embodiments, the errors are due to at least one of motion and turbulence.

According to another aspect, a LADAR imaging system is provided. The system includes a non-stationary laser source configured to emit an optical signal. The system also includes a receiver having a real aperture and configured to receive one or more reflections of the optical signal from a non-stationary target. The system also includes one or more processors configured to determine an angular resolution $\theta_{res}$ of a synthetic aperture of the receiver in an azimuth direction according to a wavelength $\lambda$ of the optical signal, a velocity vector $\vec{V}$ of the non-stationary laser source, an angle $\theta$ measured between an axis perpendicular to $\vec{V}$ and the non-stationary target, an angular velocity vector $\vec{\Omega}$ of the non-stationary target, a distance R between the non-stationary laser source and the non-stationary target, and the observational duration $T_{SA}$. The angular resolution of the synthetic aperture of the receiver in the azimuth direction is narrower than an angular resolution of the real aperture of the receiver in the azimuth direction.

Any of the aspects and/or embodiments described herein can include one or more of the following embodiments. In some embodiments, the one or more processors are configured to divide the angular resolution of the real aperture of the receiver into a plurality of range bins in the down-range direction, each of the range bins sized according to a range resolution of the optical signal. In some embodiments, the one or more processors are configured to assign each of the one or more reflections received by the receiver to at least one of the plurality of range bins. In some embodiments, the one or more processors are configured to divide the angular resolution of the real aperture of the receiver into at least one synthetic aperture resolution element, the at least one synthetic aperture resolution element having a width in the azimuth direction corresponding to the angular resolution of the synthetic aperture of the receiver and a length in the down-range direction corresponding to a size of one of the plurality of range bins. In some embodiments, the system includes a display device configured to display, for the at least one synthetic aperture resolution element, a range-Doppler map of any of the one or more reflections located within the at least one synthetic aperture element. In some embodiments, the one or more processors are configured to apply motion compensation to the one or more reflections assigned to each of the range bins, the motion compensation including one or more of global motion compensation, motion estimation, block motion compensation, variable block-size motion compensation, overlapped block motion compensation; quarter pixel motion compensation, half pixel motion compensation, a block-matching algorithm, a phase correlation, a pixel recursive algorithm, optical flow methods, corner detection, and/or random sample consensus. In some embodiments, the non-stationary laser source is configured to emit the optical signal in a pulse waveform, a chirp waveform, and/or a more complex waveform with a large time-bandwidth product. In some embodiments, the one or more processors are further configured to correct errors in data processed by the one or more processors. In some embodiments, the errors are due to at least one of motion and turbulence.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
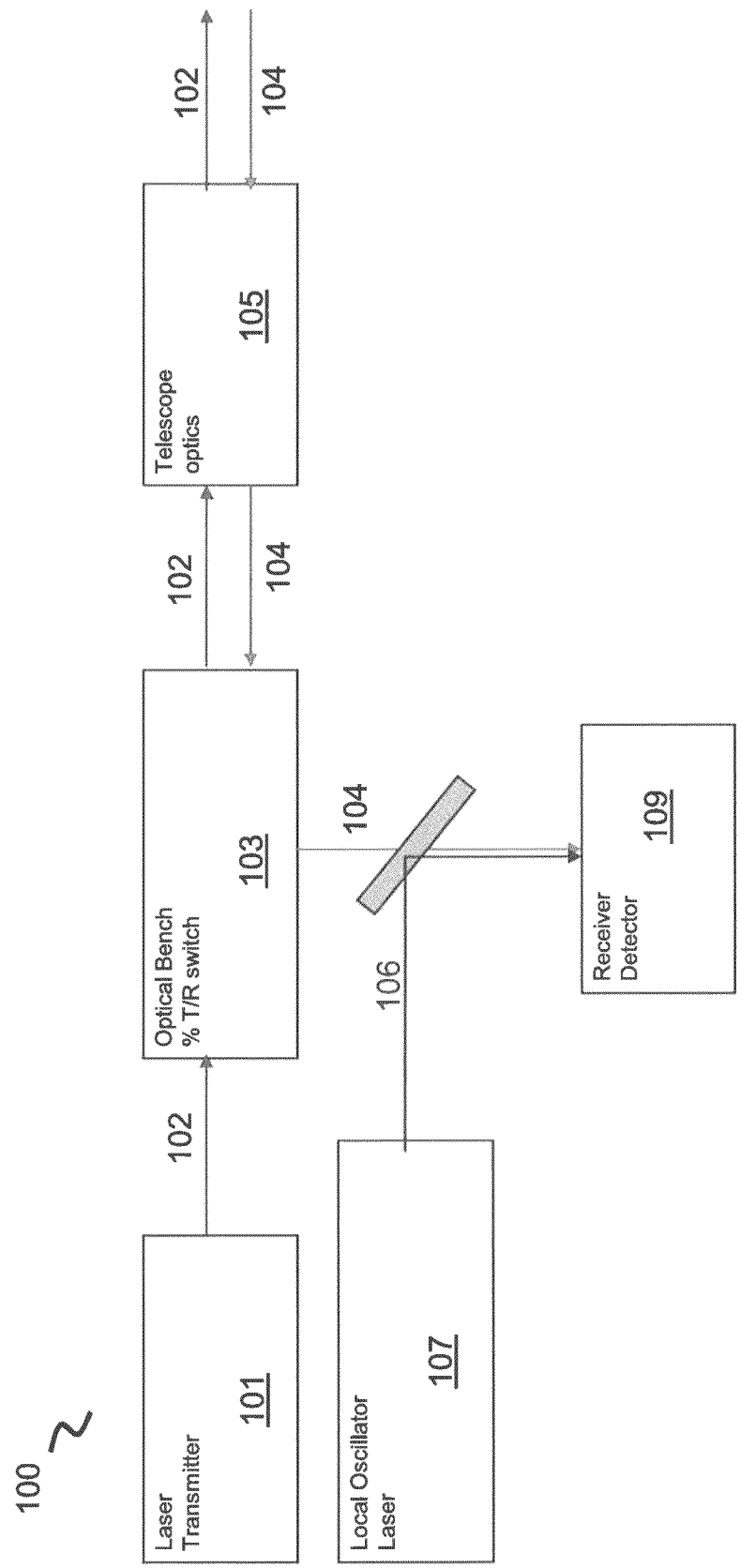
FIG. 1 is a schematic functional block diagram illustrating a heterodyne LADAR system in accordance with various embodiments.

In the following detailed description of the exemplary embodiments, reference is made to accompanying drawings, which form a part thereof, and within which are shown by way of illustration, specific embodiments, by which the subject matter may be practiced. It is to be understood that other embodiments may be utilized and structural changes may be made without departing from the scope of the disclosure.

The particulars shown herein are by way of example and for purposes of illustrative description of the embodiments only and are presented in the case of providing what is believed to be the most useful and readily understood description of the principles and conceptual aspects of the disclosure. In this regard, no attempt is made to show structural details of the subject matter in more detail than is necessary for the fundamental understanding of the disclosure, the description taken with the drawings making apparent to those skilled in the art how the several forms of the present disclosure may be embodied in practice. Further, like reference numbers and designations in the various drawings indicate like elements.

Described herein are devices and techniques for combined forward and inverse synthetic aperture imaging LADAR (combined SAL), by scanning a non-stationary target with an optical signal emitted from a non-stationary laser source, receiving reflections of the signal on a receiver, and determining the combined synthetic aperture.

In general, the resolution of a traditional LADAR sensor is proportional to the receiver aperture achieved. The larger the receiver lens diameter, the higher the resolution obtained. In general the resolution is described by the minimum angle that can be discerned between two points or stripes, and it may differ in any of the three spatial dimensions, depending on the aperture achieved in each of those dimensions. Typically, the cross dimensions are spatial, and the $3^{rd}$, down-range, is temporal, where the "aperture" would be signal bandwidth. The angular resolution in the cross-dimensions (perpendicular to down-range) is given by, $$\delta\theta \sim \lambda/D_R \quad (1)$$

where $\lambda$ is the light's wavelength, and $D_R$ is the receiving aperture diameter. Usually the x and the y direction are the same, but, when they are not, then the x-y subscripts should be used. To obtain the physical distance of resolution, the angle is multiplied by the range of the imaged object, or target, $$\delta r_{xy} = R \cdot \delta\theta_{xy} \sim R \cdot \lambda/D_{Rxy} \quad (2)$$

A laser-based imager can also obtain down-range resolution by transmitting a waveform that has bandwidth, Bw, such as an amplitude pulse or a frequency modulation. The down-range resolution is given by, $$\delta r_z \sim \frac{c}{2} \cdot \frac{1}{Bw} \quad (3)$$

where c is the speed of light and Bw is the bandwidth of the signal.

To achieve large spatial apertures, one can use a large-diameter optic, such as a large telescope, that focuses the optical signal into a recording device, such as film or a focal plane array digital detector. The focusing operation is a 2-dimensional spatial Fourier transform of the optical signal. One can perform the same operation by sampling the optical signal across the receiving aperture, measuring the intensity and phase, or the complex intensity, and then computationally performing the 2-dimensional Fourier Transform to recover the desired image. Forward synthetic aperture imaging is one example of this.

In order to sample the optical signal to reconstruct the image, one measures the complex optical signal (amplitude and phase) across the receiver aperture. Coherent or heterodyne detection is required to measure the complex optical signal, because it yields the amplitude and phase of the signal.

In coherent heterodyne detection, the optical signal is mixed with a reference signal to measure the relative phase and frequency as well as the amplitude. As shown in FIG. 1, a heterodyne detection LADAR system 100 includes a laser transmitter 101 for transmitting a laser signal 102, a transmit/receive (T/R) switch 103 for allocating the telescope optics 105 to either the transmitted laser signal 102 and/or the received reflections 104. The heterodyne detection LADAR system also includes telescope optics 105 for emitting the transmitted signal 102 and/or receiving the reflections 104, a local oscillator (LO) 107 for emitting a reference signal 106, and a receiver/detector 109 for receiving a combined signal 108, which includes the reference signal 106 and the reflections 104.

Heterodyne detection utilizes the coherent or single-frequency (color) nature of the electromagnetic wave, i.e., the laser light (transmitted signal 102). The reflections 104 of the transmitted signal 102 interact with the reference signal 106 emitted by the local oscillator 107 and only the "beat" signal of the two is detected. The beat signal occurs when the reflections 104 and the reference signal 106 are temporally coherent during the measuring time and also spatially coherent across the detector aperture.

Assuming that the field intensity of the received reflection signal 104 is given by, $A(t)\sin(\omega t+\theta)$, and that the LO 107 is a continuous laser operating at an optical frequency of $\omega'$, slightly different than the signal carrier frequency and expressed by $B \sin(\omega' t)$. The reflection signal 104 is assumed to have some phase of $\theta$ with respect to the reference signal 106. The sum of the fields at the face of the detector 109 is:

$$\text{Total Field} = A(t)\sin(\omega t+\theta)+B \sin(\omega' t) \quad (4)$$

The current is proportional to the total field squared, $$i_s \propto P_s \propto [A(t)\sin(\omega t+\theta)+B \sin \omega' t]^2 \quad (5)$$

$$i_s \propto P_s \propto A(t)^2 \sin^2(\omega t+\theta)+B^2 \sin^2\omega' t+2A(t)B\cdot\sin(\omega t+\theta)\sin(\omega' t)=A(t)^2 \sin^2(\omega t+\theta)+B^2 \sin^2\omega' t+A(t)B[\cos((\omega-\omega')t+\theta)-\cos((\omega+\omega')t+\theta)] \quad (6)$$

The difference in optical carrier frequency is defined as the IF frequency, $$\omega_{if}=(\omega-\omega')/2\pi \quad (7)$$

Assume that the detector intrinsic frequency response eliminates the double frequency components of eq. (6). Also assume that the LO 107 reference signal 106 intensity is much larger than the reflections 104, such that B>>A, and that a high-pass filter eliminates the DC term due to the direct LO 107 illumination, then eq. (6) is simplified to be, $$i_s \propto A(t)B \cos(\omega_{if}t+\theta) \quad (8)$$

Two important features are apparent from the final result in eq. (8). The first is that the LO 107 field intensity, B, appears as a gain multiplier of the reflection 104. The second is that if the LO 107 carrier frequency, $\omega'$, is well known, then $\omega_{if}$ represents the reflected 104 optical frequency down shifted to an electronic sampling level as well as the reflected 104 optical signal phase, $\theta$. Therefore, the changes in optical frequency due to a target reflection, such as the Doppler shift, can be measured using common electronic components. The heterodyne process has converted the modulation on the original optical or radio signal carrier 102 into the same modulation on a convenient intermediate frequency, IF, electric current.

When mapping either ground or a target at long ranges, the line-of-sight resolution is obtained by using a high-bandwidth signal, such as a short pulse or train of pulses, but the cross-range resolution is usually limited by the detector pixel field of view (FOV). The best theoretical angular pixel resolution is given the simple relation, $$\text{FOV}=\lambda/D_r \quad (9)$$

where $\lambda$ is the optical signal wavelength and $D_r$ is the receiver aperture.

However, real apertures and telescopes approaching one meter or more in diameter are very expensive, sensitive to thermal and gravitational distortions, and are typically very heavy for medium-size aircraft or other movable platforms to carry. Therefore, the angular pixel resolution of real apertures is practically limited by hardware and may be insufficient at long distances. A solution to this limitation is to use synthetic aperture imaging to improve angular resolution.

Figure 2A:
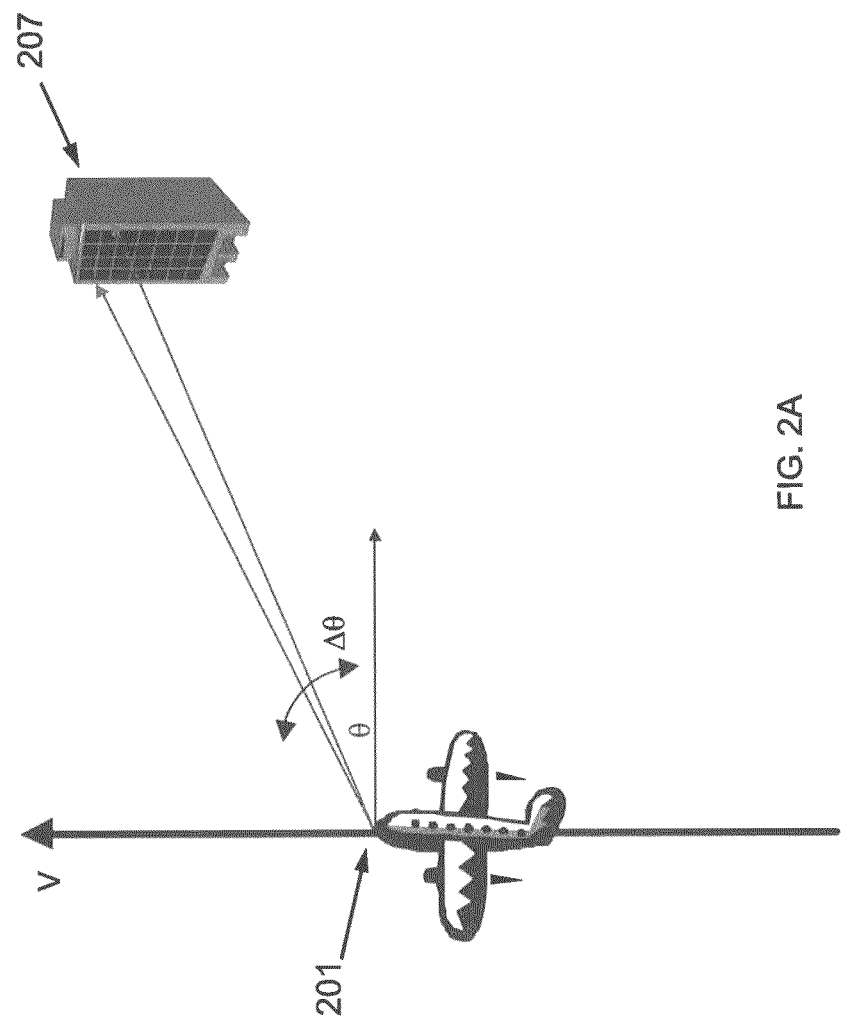
FIGS. 2A-2B are graphical diagrams illustrating a forward synthetic aperture imaging (forward SAL) scenario.
Figure 2B:
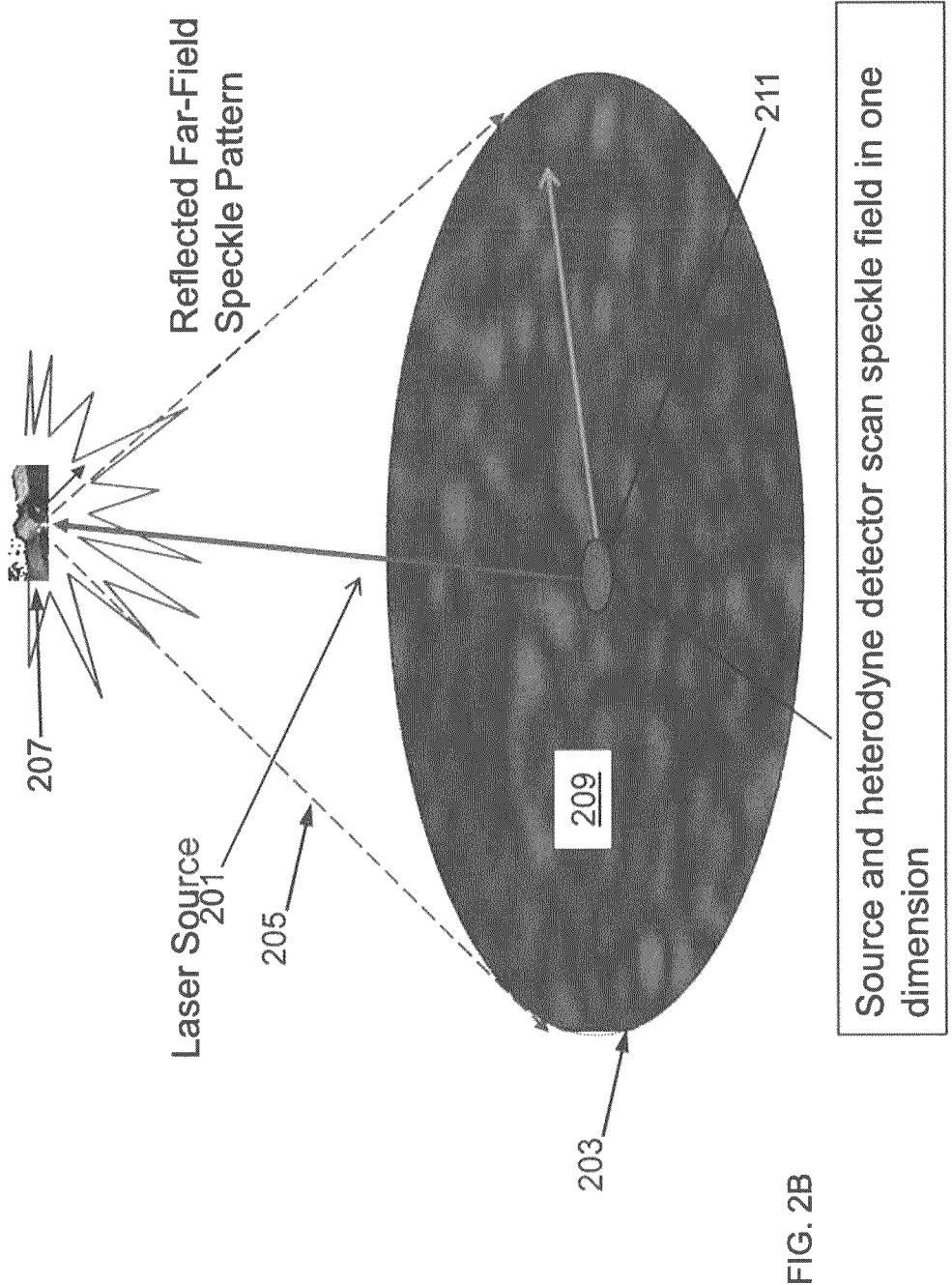

Synthetic aperture imaging is a method by which a receiver collects reflected field information spanning a distance larger than the physical aperture allows. In applications where the target is stationary, as shown in FIGS. 2A-2B, a forward synthetic aperture imaging (or forward SAL) is used. Forward SAL requires moving the laser source 201 and the receiver 211 along a path across the reflected field 203, and sampling the amplitude and phase of the return signal 205 from a stationary target 207. The return signal 205 from a rough (non-glint) target 207 creates a speckle pattern 209 in the far-field 203, and the receiving detector 211 samples its amplitude and phase. The target image is reconstructed by taking the spatial Fourier Transform of that return signal 205.

The forward SAL angular resolution is obtained according to the following operations:

The measured Doppler velocity is expressed as $$f_d = \frac{2V}{\lambda} \cdot \sin(\theta) \quad (10)$$

The change in frequency due to a small angle change is obtained by taking the derivative of the expression above, yielding $$\delta f_d = \frac{2V}{\lambda} \cdot \cos(\theta) \cdot \delta\theta \quad (11)$$

Eqs. 10 and 11 can then be used to solve for the angular resolution in terms of the Doppler frequency resolution $$\delta\theta = \frac{\lambda \cdot \delta f_d}{2V \cdot \cos(\theta)} \quad (12)$$

The best frequency resolution is obtained from Fourier theory to be $$\delta f_d \approx \frac{1}{T_{meas}} \quad (13)$$

which yields the synthetic aperture relation for $\delta\theta$ $$\delta\theta = \frac{\lambda}{2V \cdot T_{meas} \cdot \cos(\theta)} = \frac{\lambda}{2 \cdot L_{SAL}} \quad (14)$$

where the measuring time $T_{meas}$ is then referred to as the Synthetic Aperture Time or $T_{SA}$, $f_d$ is the Doppler shift measured due to the aircraft motion, V is the velocity of the laser source 201 and the receiver 211, $\delta f_d$ is the accuracy with which the Doppler shift can be measured, and $\delta\theta$ is the accuracy with which the cross-range angle can be determined (resultant FOV).

In a forward SAL, usually the LADAR is flying on a platform, such as an aircraft, with velocity V. If the target 207 being imaged is not exactly to the side of the direction of flight by an angle θ, then the effective synthetic aperture is reduced by cos(θ), which is why $L_{SAL}$ is expressed as $$L_{SAL} = V \cdot T_{SA} \cdot \cos(\theta) \quad (15)$$

in eq. 14 above.

The SA length, $L_{SAL}$, is multiplied by a factor of two because, as the laser source 201 moves along the path, the speckle pattern 209 will move in the opposite direction, as if reflected from a mirror. Therefore, the total speckle length captured includes one $L_{SAL}$ resulting from the distance traveled by the detector 211 and a second $L_{SAL}$ resulting from the speckle motion induced by the distance traveled by the laser source 201.

Figure 3:
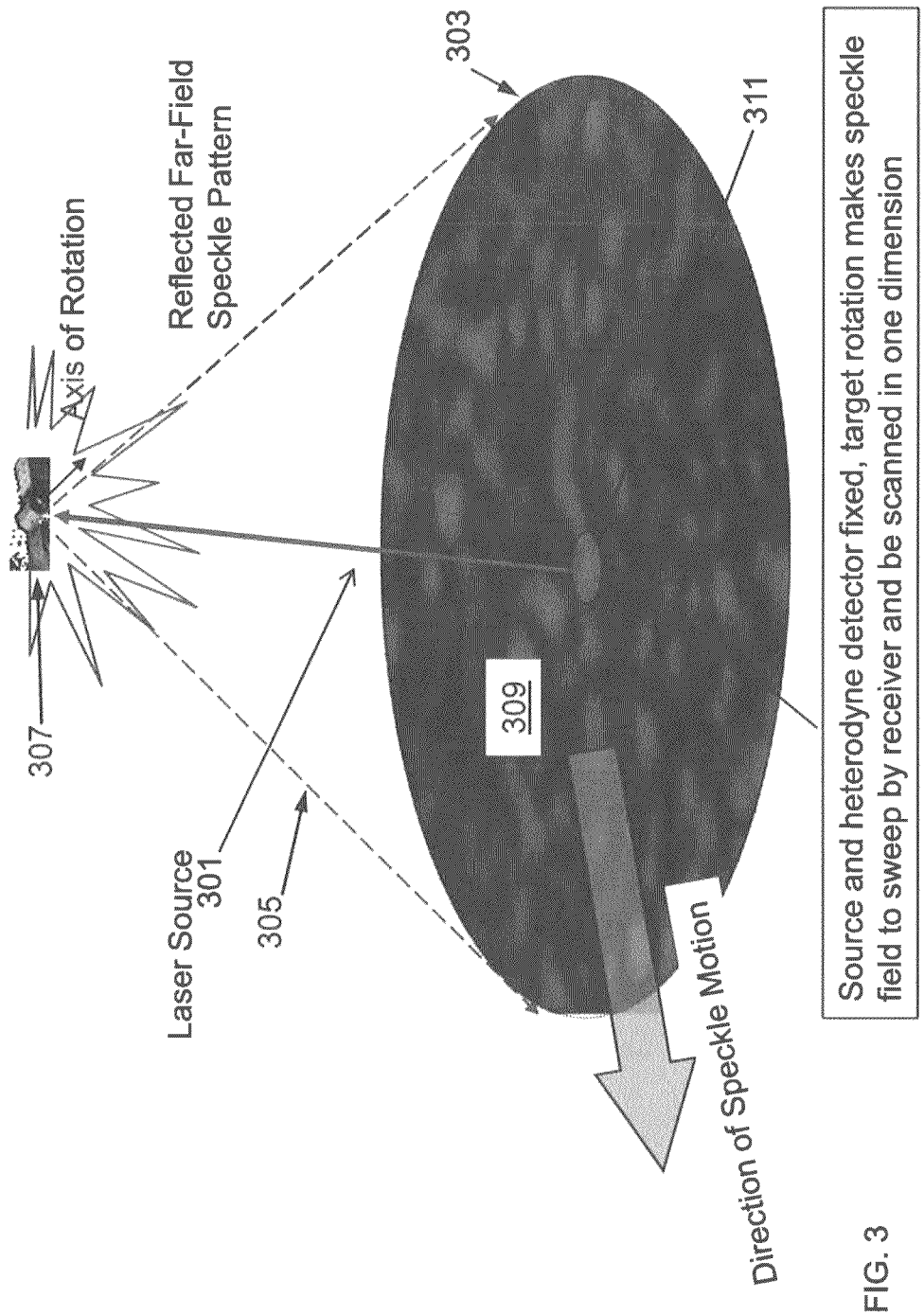
FIG. 3 is a graphical diagram illustrating an inverse synthetic aperture imaging (ISAL) scenario.

As shown in FIG. 3, another synthetic aperture imaging approach, inverse synthetic aperture imaging (or ISAL), is suitable for sampling the speckle field at the receiver when the target is rotating. Inverse SAL requires a stationary laser source 301 to scan the rotating target 307. Then, similar to a mirror, the reflected return signal 305 results in a speckle pattern 309 sweeping by the receiver 311. This sweep makes it possible for the receiver 311 to sample the speckle pattern 309 while the receiver 311 remains stationary.

In the inverse SAL case, a target 307 is rotating at an angular velocity ω while the LADAR source 301 and receiver 311 are in a fixed position at a distance R from the target 307. The speckle pattern 309 reflected from the target 307 will rotate at twice the rotational velocity of the target 307, similar to the light reflected from a rotating mirror. The length of the speckle field 309 scanned by the LADAR will be $$L_{ISAL} = 2\Omega \cdot R \cdot T_{SA} \quad (16)$$

Replacing $2 \cdot L_{SAL}$ with $L_{ISAL}$ in eq. 14 above, the achieved angular resolution, $\theta_{res}$, is $$\delta\theta = \frac{X_{res}}{R} = \frac{\lambda}{L_{ISAL}} = \frac{\lambda}{2\Omega \cdot R \cdot T_{SA}} \quad (17)$$

As described above, the problem with forward SAL is that, if both the target 207 and the laser source 201 are moving, the movement of the target 207 is accounted for as error and, as a result, accuracy and performance of the LADAR system is negatively impacted. Similarly, with inverse SAL, if both the target 307 and the laser source 301 are moving, the movement of the laser source 301 is accounted for as error and, similarly, accuracy and performance of the LADAR system is negatively impacted.

Figure 4A:
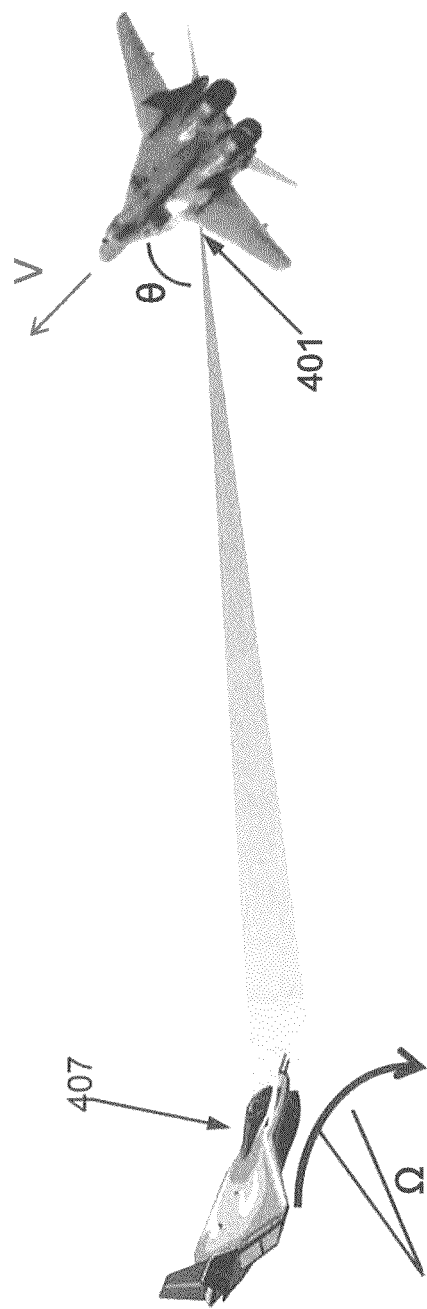
FIGS. 4A-4B are graphical diagrams illustrating a combined synthetic aperture imaging (combined SAL) scenario in accordance with various embodiments.
Figure 4B:
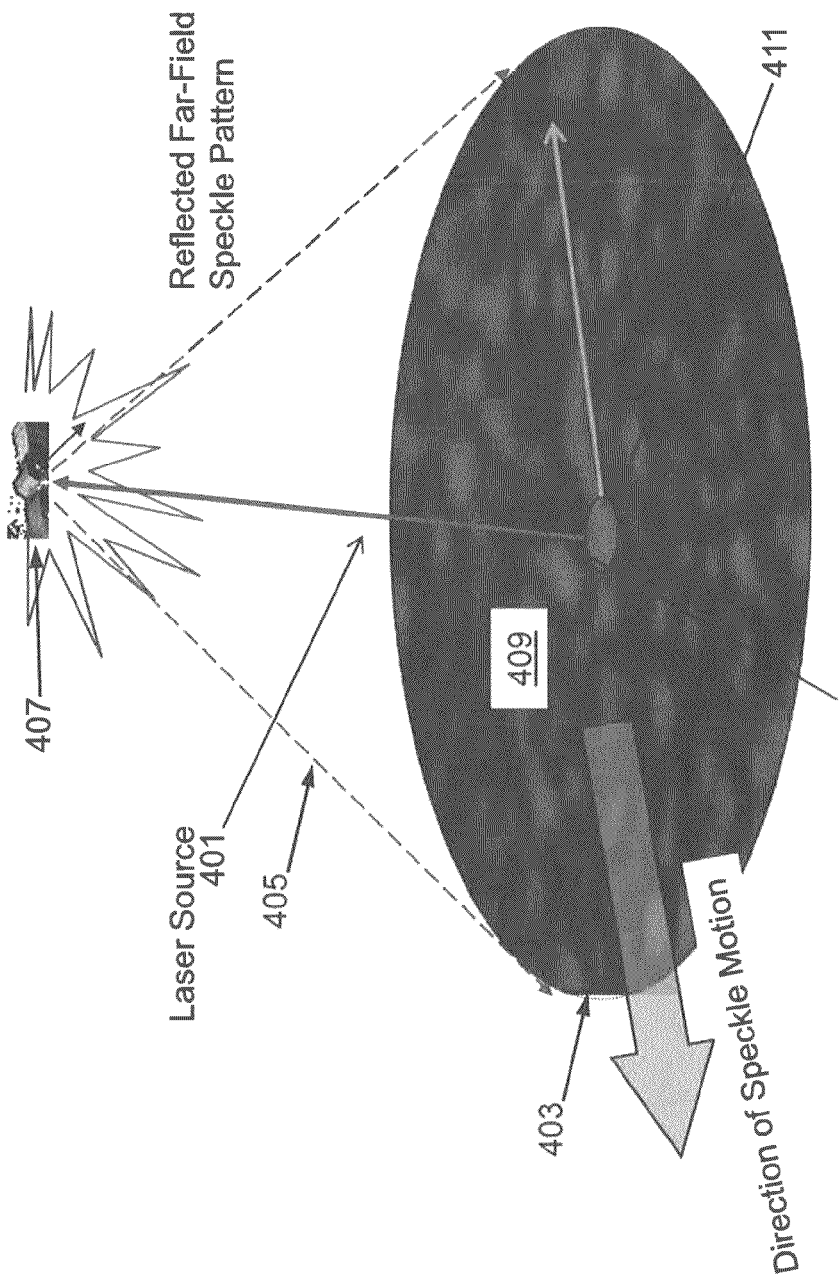

The methods and systems described herein provide combined forward and inverse synthetic aperture imaging LADAR (combined SAL). As shown in FIGS. 4A-4B, in the combined SAL case, a non-stationary laser source 401 scans the rotating target 407. Thus, the laser source is moved along a path across the reflected field 403 as in forward SAL while the reflected return signal 405 results in the speckle pattern 409 sweeping by the receiver 411 as in inverse SAL. Therefore, the total combined synthetic aperture length ($L_{COMB}$) includes one $L_{SAL}$ resulting from the distance traveled by the detector 411, a second $L_{SAL}$ resulting from the speckle motion induced by the distance traveled by the laser source 401, and an $L_{ISAL}$ resulting from the rotating target 407.

Importantly, any determination of the combined synthetic aperture length ($L_{COMB}$) requires knowledge of the relative directions of the motion of the laser source/receiver 401/411 and the rotation of the target 407 and thus the individual synthetic aperture lengths should be scanned as vectors. Therefore, the combined angular resolution achieved from the combined configuration is $$\theta_{res} = \frac{X_{res}}{R} = \frac{\lambda}{2\vec{L}_{SAL} + \vec{L}_{ISAL}} = \frac{\lambda}{2(\vec{V}\cos(\theta) + \vec{\Omega} \cdot R) \cdot T_{SA}} \quad (18)$$

In general, the ISAL component will usually have greater impact on the combined angular resolution than the forward SAL portion of the equation because the typical ISAL $T_{meas}$ will be less than ~150 μs, whereas the typical forward SAL $T_{meas}$ for similar resolution will be greater than 10 ms.

In accordance with various embodiments, the data can then be post-processed to correct various errors such as platform motion and turbulence during image reconstruction.

Figure 5:
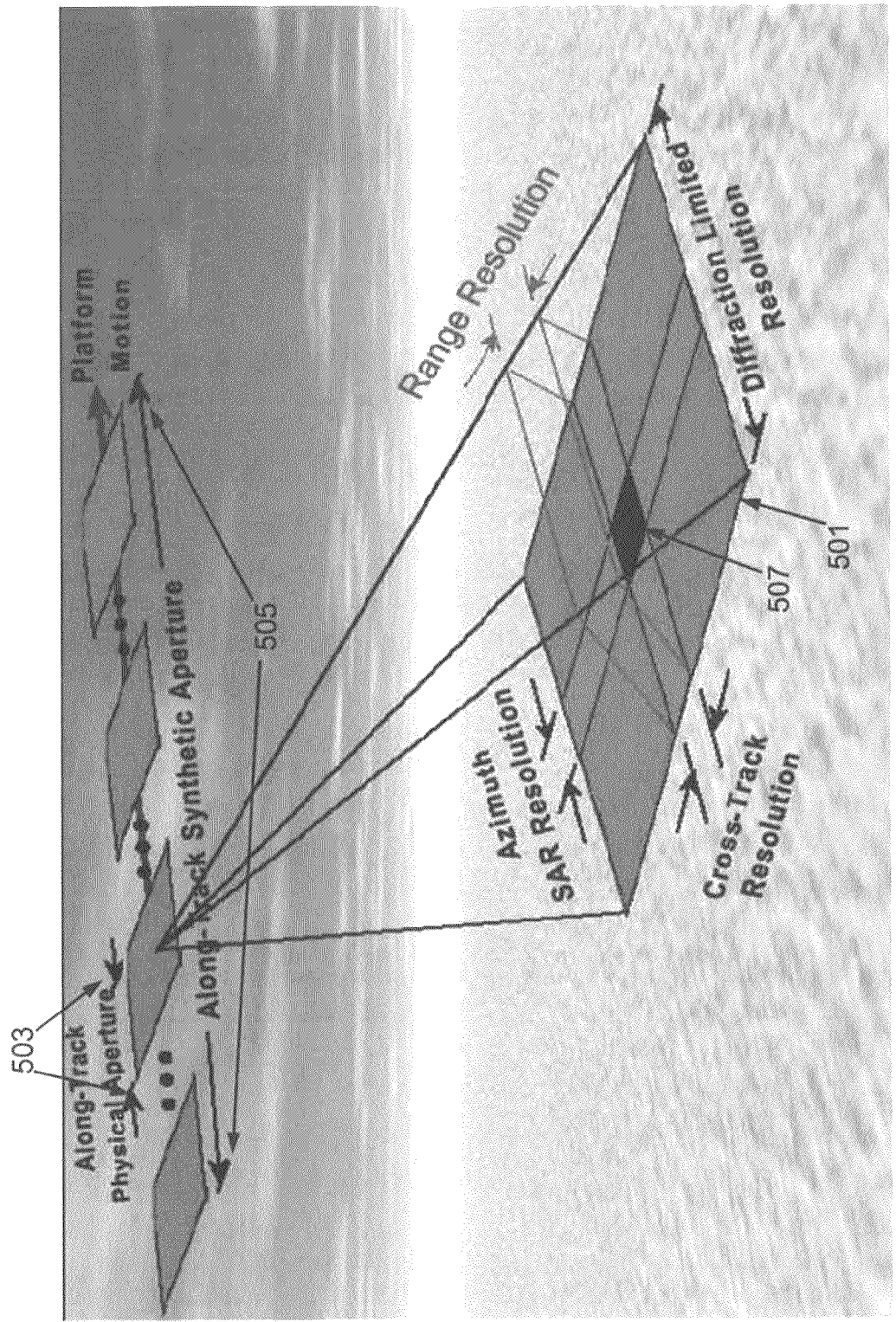
FIG. 5 is a graphical diagram illustrating comparative projections of real aperture resolution and synthetic aperture resolution in accordance with various embodiments.

Referring now to FIG. 5, the resolution of each real aperture pixel 501 is diffraction limited both in azimuth and in the cross-track dimension. As shown in FIG. 5, the synthetic aperture pixel 507 affords substantially improved resolution, i.e., the synthetic aperture can focus on a much smaller target area at the same range. This improved resolution results because, as shown in FIG. 5, the along-track synthetic aperture 505 is much larger than the along-track physical aperture 503. The combined SAL methodology described above allows for maximization of the synthetic azimuth resolution. In order to optimize LADAR system performance and the overall synthetic aperture resolution of the synthetic aperture pixel 507, in accordance with various embodiments, the cross-track resolution will ideally match the synthetic azimuth resolution.

Cross-track resolution is generally limited by range resolution and, therefore, in order to achieve the desired cross-track resolution, the optical signal transmitted by the laser source should have high enough bandwidth to achieve the desired range resolution. In accordance with various embodiments, the waveform used to achieve the desired range resolution can be made of simple narrow pulses, where the bandwidth is approximately given by $$Bw \sim \frac{1}{2\tau} \quad (19)$$

where τ is the width of the pulses. Another commonly used waveform is a train of linear FM frequency sweeps, referred to as "chirps", for which the bandwidth is equivalent to the magnitude of the frequency sweep. It will be apparent in view of this disclosure that there are many other waveforms possible and that any other suitable waveform can be used in accordance with various embodiments.

Figure 6:
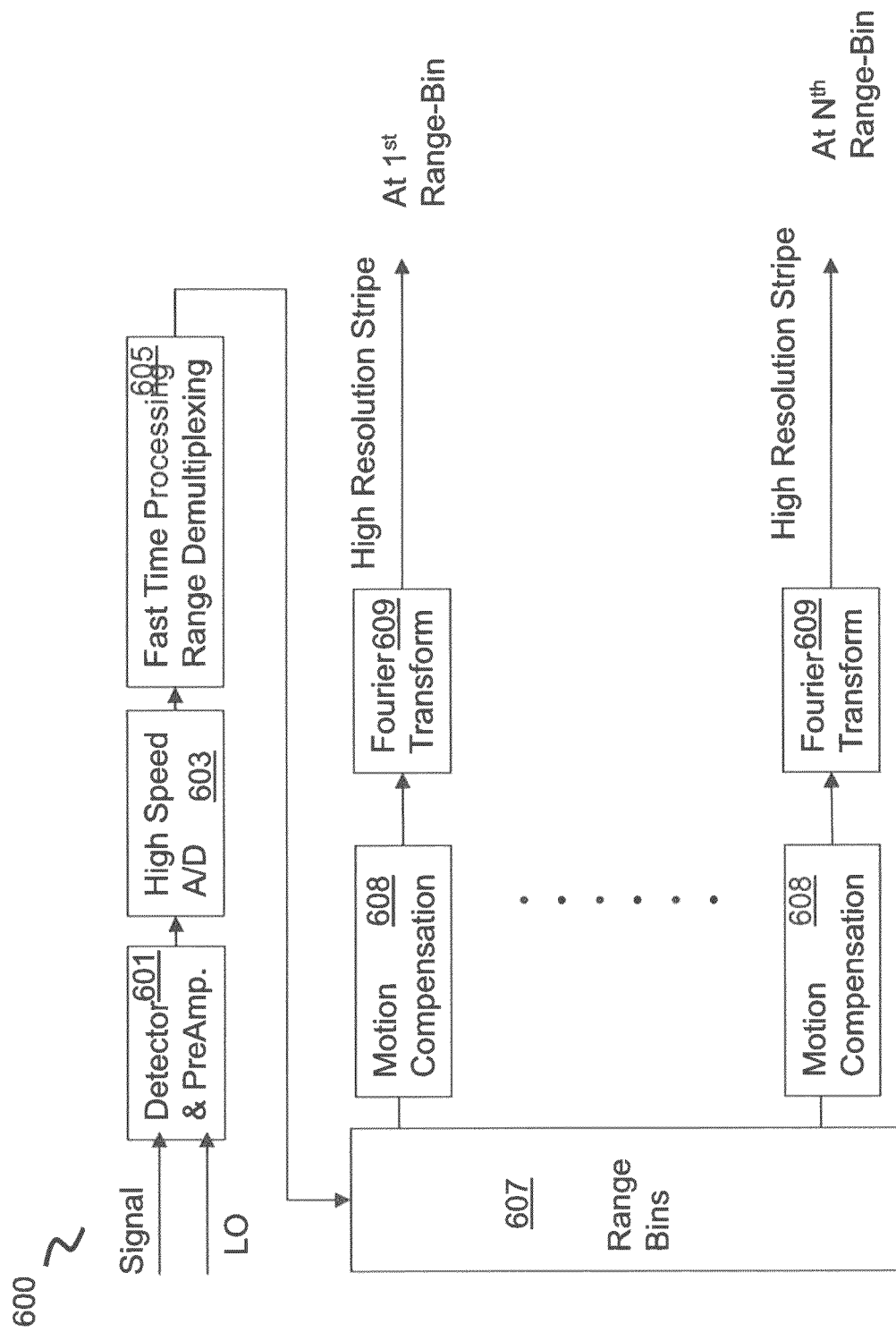
FIG. 6 is a schematic functional block diagram illustrating a combined SAL LADAR signal processor in accordance with various embodiments.

As shown in FIG. 6, in accordance with various embodiments, a combined synthetic aperture LADAR system can include a signal processor 600 to determine range and combined azimuth synthetic aperture. The signal processor 600 includes a detector/preamp 601 for detecting a heterodyne signal, an analog to digital converter 603 for converting the detected signal to a digital signal, a demultiplexer 605, e.g., a typical range profiler, for separating the returns of each pulse or chirp according to range. For each pulse or chirp transmitted, a complex amplitude (magnitude and phase) is recorded for each range-resolved element or range bin 607. This process is continued for a period T, which is the synthetic aperture time. Each range bin 607 will then have a phase history for a duration T, which will then allow the signal processor 600 to create azimuth resolution elements across the range resolved stripe. The enhanced azimuth resolution is achieved by taking the Fourier Transform 609 of the complex signal at each range bin 607. The frequency spread of the result of the Fourier Transform 609 corresponds to the target spatial content in the azimuth direction. The azimuth Fourier Transform 609 is often referred as slow time processing, and most, if any, motion compensation corrections 608 are applied at this point. The range profiling or separation is generally referred to as fast time processing.

Figure 7:
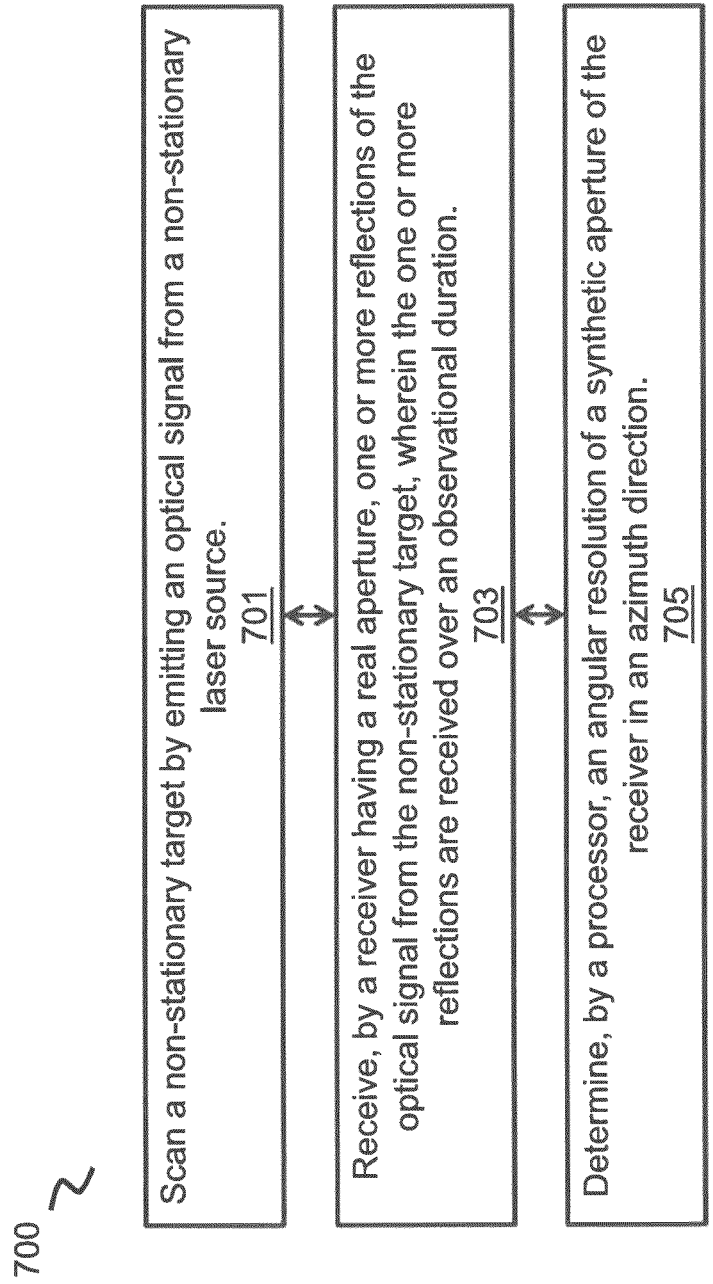
FIG. 7 is a flow chart illustrating a method for combined SAL in accordance with various embodiments.

Referring now to FIG. 7, in accordance with various embodiments, a method 700 for generating radio frequency waveform signals in a radio waveform generation device can include the steps of scanning 701 a non-stationary target by emitting an optical signal from a non-stationary laser source, receiving 703, by a receiver having a real aperture, one or more reflections of the optical signal from the non-stationary target, wherein the one or more reflections are received over an observational duration, and determining 705, by a processor, an angular resolution of a synthetic aperture of the receiver in an azimuth direction according to the relationship $$\theta_{res} = \frac{\lambda}{2(\vec{V}\cos\theta + \vec{\Omega}\cdot R)\cdot T_{SA}},$$

wherein $\theta_{res}$ is the angular resolution of the synthetic aperture of the receiver, $\lambda$ is a wavelength of the optical signal, $\vec{V}$ is a velocity vector of the non-stationary laser source, $\theta$ is an angle measured between an axis perpendicular to $\vec{V}$ and the non-stationary target, $\vec{\Omega}$ is an angular velocity vector of the non-stationary target, R is a distance between the non-stationary laser source and the non-stationary target, and $T_{SA}$ is the observational duration.

In step 701, a laser source, e.g., a gas laser, a chemical laser, an Excimer laser, a solid state laser, a fiber laser, a photonic crystal laser, a semiconductor laser, dye laser, free-electron laser, and/or any other suitable laser source, scans a non-stationary target, e.g., an aircraft, a tank, a train, a drone, a satellite, a car, a ship, a boat, and/or any other moving object, by emitting an optical signal from a non-stationary source, e.g., an aircraft, a tank, a train, a drone, a satellite, a car, a ship, a boat, and/or any other suitable moving platform.

In step 703, a receiver, e.g., a photodetector, light sensor, active-pixel sensor, charge-coupled device, particle detector, cryogenic detector, photodiode, chemical detector, optical detector, bolometer, pyroelectric detector, Golay cell, photoresistor, photovoltaic cell, photomultiplier tube, phototube, phototransistor, quantum dot photoconductors, and/or any other suitable receiver, receives one or more reflections of the optical signal from the non-stationary laser source over an observational duration, e.g., $T_{SA}$.

In step 705, a processor such as, for example, signal processor 600 described above is used to determine an angular resolution of a synthetic aperture of the receiver in an azimuth direction, wherein the angular resolution of the synthetic aperture of the receiver in the azimuth direction is narrower than an angular resolution of the real aperture of the receiver in the azimuth direction. It will be apparent in view of this disclosure that the processor can include any suitable processor, e.g., a general purpose microprocessor, a special purpose microprocessor, a field programmable gate array (FPGA) and/or an application-specific integrated circuit (ASIC).

In accordance with various embodiments, additional steps can include, for example, dividing the angular resolution of the real aperture of the receiver into a plurality of range bins in the down-range direction, each of the range bins sized according to a range resolution of the optical signal. The step of dividing can be performed, in accordance with various embodiments, using, for example, a demultiplexer and/or a channelizer. In accordance with various embodiments, each of the one or more reflections received by the receiver is assigned to at least one of the plurality of range bins. In accordance with various embodiments, the method can include dividing the angular resolution of the real aperture, e.g., real aperture pixel 501, into at least one synthetic aperture resolution element, e.g., synthetic aperture pixel 507, the at least one synthetic aperture resolution element having a width in the azimuth direction corresponding to the angular resolution of the synthetic aperture of the receiver and a length in the down-range direction corresponding to a size of one of the plurality of range bins.

In accordance with various embodiments, the method also includes plotting, e.g., on a display device, for the at least one synthetic aperture resolution element, a range-Doppler map of any of the one or more reflections located within the at least one synthetic aperture element. The display device can include, for example but without limitation, a cathode ray tube (CRT), a liquid crystal display (LCD), a touchscreen, a projection display, and/or any other suitable display.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data, e.g., magnetic, magneto-optical disks, or optical disks.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball, by which the user can provide input to the computer, e.g., interact with a user interface element. Other kinds of devices can be used to provide for interaction with a user. Other devices can, for example, be feedback provided to the user in any form of sensory feedback, e.g., visual feedback, auditory feedback, or tactile feedback. Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, e.g., local area network (LAN), wide area network (WAN), campus area network (CAN), metropolitan area network (MAN), home area network (HAN)), a private IP network, an IP private branch exchange (IPBX), a wireless network, e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network, e.g., RAN, Bluetooth, code-division multiple access (CDMA) network, time division multiple access (TDMA) network, global system for mobile communications (GSM) network), and/or other circuit-based networks.

The computing system can also include one or more computing devices. A computing device can include, for example, a computer, a computer with a browser device, a telephone, an IP phone, a mobile device, e.g., cellular phone, personal digital assistant (PDA) device, laptop computer, electronic mail device, and/or other communication devices. The browser device includes, for example, a computer, e.g., desktop computer, laptop computer, with a World Wide Web browser, e.g., Microsoft® Internet Explorer® available from Microsoft Corporation, Mozilla® Firefox available from Mozilla Corporation. The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present disclosure has been described with reference to exemplary embodiments, it is understood that the words that have been used herein, are words of description and illustration, rather than words of limitation. Changes may be made, within the purview of the appended claims, as presently stated and as amended, without departing from the scope and spirit of the present disclosure in its aspects.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method for combined forward and inverse synthetic aperture LADAR imaging comprising:

scanning a non-stationary target by emitting an optical signal from a non-stationary laser source;

receiving, by a receiver having a real aperture, one or more reflections of the optical signal from the non-stationary target, wherein the one or more reflections are received over an observational duration; and determining, by a processor, an angular resolution $\theta_{res}$ of a synthetic aperture of the receiver in an azimuth direction according to a wavelength $\lambda$ of the optical signal, a velocity vector $\vec{V}$ of the non-stationary laser source, an angle $\theta$ measured between an axis perpendicular to $\vec{V}$ and the non-stationary target, an angular velocity vector $\vec{\Omega}$ of the non-stationary target, a distance R between the non-stationary laser source and the non-stationary target, and the observational duration $T_{SA}$;

wherein the angular resolution of the synthetic aperture of the receiver in the azimuth direction is narrower than an angular resolution of the real aperture of the receiver in the azimuth direction; and wherein the angular resolution $\theta_{res}$ of the synthetic aperture of the receiver in the azimuth direction is according to the relationship $$\theta_{res} = \frac{\lambda}{2(\vec{V}\cos\theta + \vec{\Omega}\cdot R)\cdot T_{SA}}.$$

2. The method of claim 1, further comprising:
dividing the angular resolution of the real aperture of the receiver into a plurality of range bins in the down-range direction, each of the range bins sized according to a range resolution of the optical signal; and
assigning each of the one or more reflections received by the receiver to at least one of the plurality of range bins.

3. The method of claim 2, further comprising:
dividing the angular resolution of the real aperture of the receiver into at least one synthetic aperture resolution element, the at least one synthetic aperture resolution element having a width in the azimuth direction corresponding to the angular resolution of the synthetic aperture of the receiver and a length in the down-range direction corresponding to a size of one of the plurality of range bins.

4. The method of claim 3, further comprising plotting, for the at least one synthetic aperture resolution element, a range-Doppler map of any of the one or more reflections located within the at least one synthetic aperture element.

5. The method of claim 2, further comprising: applying motion compensation to the one or more reflections assigned to each of the range bins, wherein the motion compensation includes one or more of global motion compensation, motion estimation, block motion compensation, variable block-size motion compensation, overlapped block motion compensation; quarter pixel motion compensation, half pixel motion compensation, a block-matching algorithm, a phase correlation, a pixel recursive algorithm, optical flow methods, corner detection, and/or random sample consensus.

6. The method of claim 1, wherein a waveform of the optical signal is a pulse waveform, a chirp waveform, and/or a more complex waveform with a large time-bandwidth product.

7. The method of claim 1, further comprising correcting errors in data processed by the processor.

8. The method of claim 7, wherein the errors are due to at least one of motion and turbulence.

9. A LADAR imaging system comprising:
a non-stationary laser source configured to emit an optical signal;
a receiver having a real aperture and configured to receive one or more reflections of the optical signal from a non-stationary target;
one or more processors configured to determine an angular resolution $\theta_{res}$ of a synthetic aperture of the receiver in an azimuth direction according to a wavelength $\lambda$ of the optical signal, a velocity vector $\vec{V}$ of the non-stationary laser source, an angle $\theta$ measured between an axis perpendicular to $\vec{V}$ and the non-stationary target, an angular velocity vector $\vec{\Omega}$ of the non-stationary target, a distance R between the non-stationary laser source and the non-stationary target, and the observational duration $T_{SA}$;

wherein the angular resolution of the synthetic aperture of the receiver in the azimuth direction is narrower than an angular resolution of the real aperture of the receiver in the azimuth direction; and wherein the angular resolution $\theta_{res}$ of the synthetic aperture of the receiver in the azimuth direction is according to the relationship $$\theta_{res} = \frac{\lambda}{2(\vec{V}\cos\theta + \vec{\Omega}\cdot R)\cdot T_{SA}}.$$

10. The system of claim 9, wherein the one or more processors are configured to:
divide the angular resolution of the real aperture of the receiver into a plurality of range bins in the down-range direction, each of the range bins sized according to a range resolution of the optical signal; and
assign each of the one or more reflections received by the receiver to at least one of the plurality of range bins.

11. The system of claim 10, wherein the one or more processors are configured to divide the angular resolution of the real aperture of the receiver into at least one synthetic aperture resolution element, the at least one synthetic aperture resolution element having a width in the azimuth direction corresponding to the angular resolution of the synthetic aperture of the receiver and a length in the down-range direction corresponding to a size of one of the plurality of range bins.

12. The system of claim 11, further comprising a display device configured to display, for the at least one synthetic aperture resolution element, a range-Doppler map of any of the one or more reflections located within the at least one synthetic aperture element.

13. The system of claim 10, wherein the one or more processors are configured to apply motion compensation to the one or more reflections assigned to each of the range bins, the motion compensation including one or more of global motion compensation, motion estimation, block motion compensation, variable block-size motion compensation, overlapped block motion compensation; quarter pixel motion compensation, half pixel motion compensation, a block-matching algorithm, a phase correlation, a pixel recursive algorithm, optical flow methods, corner detection, and/or random sample consensus.

14. The system of claim 9, wherein the non-stationary laser source is configured to emit the optical signal in a pulse waveform, a chirp waveform, and/or a more complex waveform with a large time-bandwidth product.

15. The system of claim 9, wherein the one or more processors are further configured to correct errors in data processed by the one or more processors.

16. The system of claim 15, wherein the errors are due to at least one of motion and turbulence.

* * * * *